Aug. 11, 1936.                J. B. NEWSOM                 2,050,761
                                QUARRYING
                         Filed April 18, 1933          2 Sheets-Sheet 1
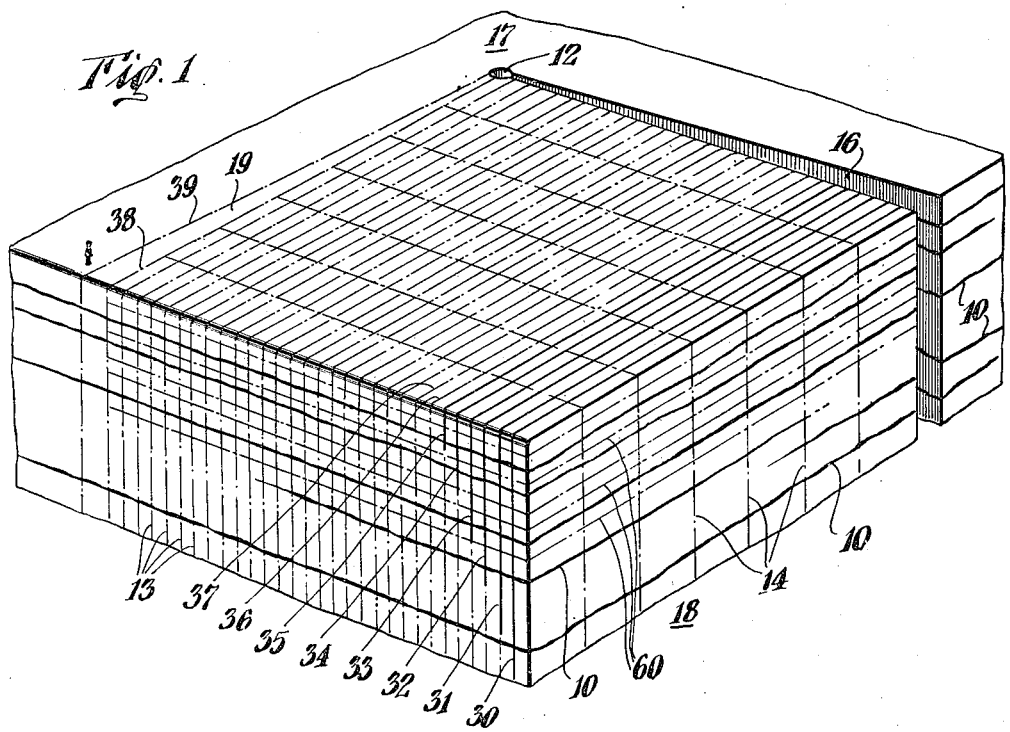
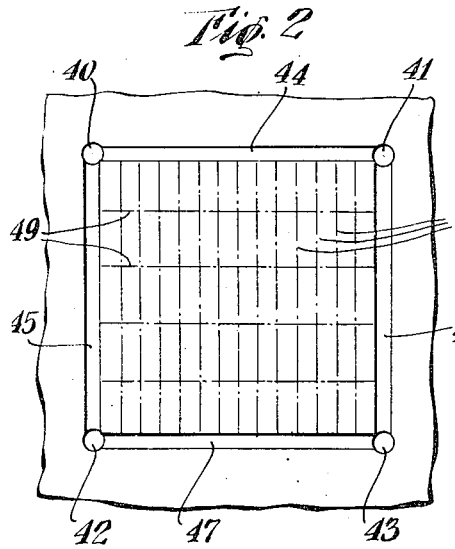
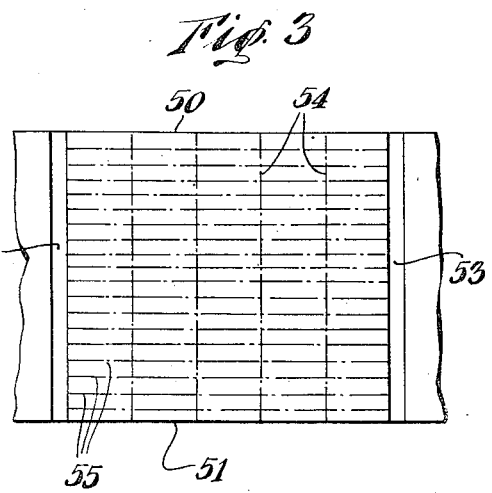
INVENTOR
John B. Newsom
BY Austin & Dix
ATTORNEYS Aug. 11, 1936.   J. B. NEWSOM   2,050,761
QUARRYING
Filed April 18, 1933   2 Sheets-Sheet 2
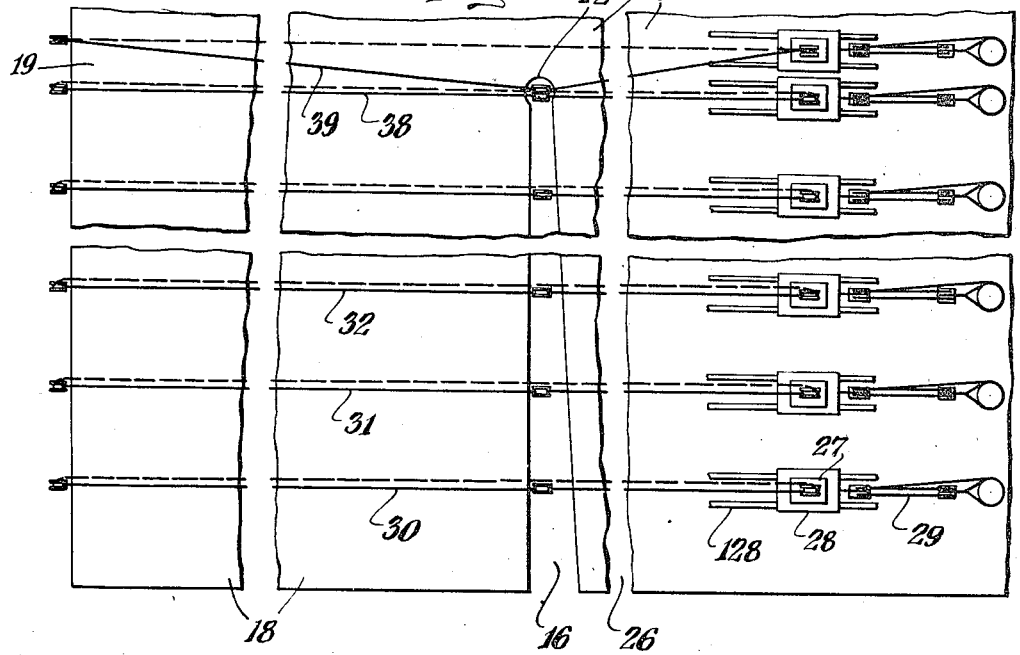
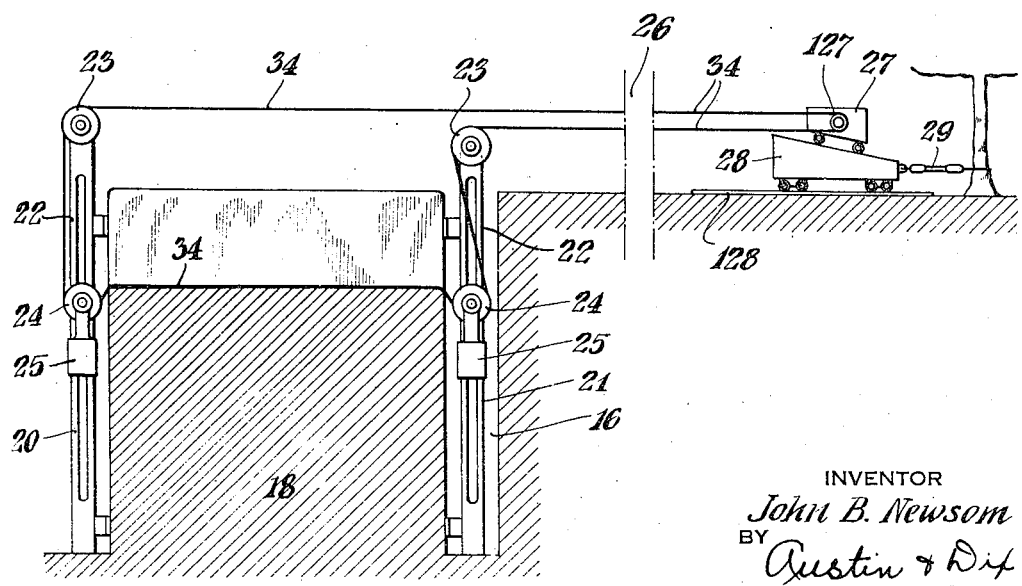
INVENTOR
John B. Newsom
BY
Austin & Dix
ATTORNEYS Patented Aug. 11, 1936

2,050,761

UNITED STATES PATENT OFFICE 2,050,761

QUARRYING

John B. Newsom, Bloomington, Ind.

Application April 18, 1933, Serial No. 666,745

7 Claims. (Cl. 262—28)

The invention relates to quarrying, and more particularly to quarrying blocks of Indiana limestone.

According to the invention, a ledge of rock, such as Indiana limestone, is systematically attacked by a series of wire saws arranged preferably in parallel formation and cutting the entire working depth of the ledge before any quarry blocks are removed. The ledge may be sawed either in one direction only or also in a second direction at an angle to the first direction. In either case, a number of upstanding columns of stone is made extending the entire workable depth of the deposit. These columns may stand in place until required for market. As the quarry blocks are needed, blocks of the desired depth may be removed, starting at the top, in layer after layer, the blocks being broken loose either at the natural flaws or by splitting at other points by wedges.

The overburden on the deposit may be removed in the usual manner and the ledge may be freed in different ways, depending upon conditions. The invention is applicable to a number of different quarry layouts. For example, if the ledge is already freed on two adjacent vertical faces, a hole may be drilled at a point remote from the two vertical faces and wedge pieces connecting the hole with the two free faces removed to expose the other two vertical faces. The hole and wedge pieces will, of course, extend preferably the entire workable depth of the quarry.

The several saws may be absolutely independent, having separate driving devices so that they may be transferred to make other cuts separately and so that each saw may take advantage of soft spots it happens to strike. If desired, a much greater length of saw than that required by the topography may be used to increase the life of the saw.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates diagrammatically a deposit being quarried according to the invention;

Figs. 2 and 3 illustrate diagrammatically modified forms of quarry layouts according to the invention;

Fig. 4 is a diagrammatic plan view illustrating a series of saws making one set of cuts; and Fig. 5 is a section through the quarry illustrating the operation of a single wire saw.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, an Indiana limestone deposit is illustrated diagrammatically in perspective having at the beginning of the present operation two adjacent faces free and the overburden removed. The body of the deposit is denoted by 17 and the ledge to be quarried is denoted by 18. The natural horizontal flaws are indicated by wavy lines, denoted by 10. The dot-and-dash lines 60 indicate points where horizontal breaks are to be made by splitting, to free the quarry blocks from the ledge, as explained hereinafter.

In the form shown, the ledge 18 is in the process of having its first set of vertical wire saw cuts made. The hole 12 has been drilled and the wedge piece removed from the space 16. The saws have made the cuts 30, 31, 32, 33, 34 and 35, these cuts being denoted by heavy lines. The vertical dot-and-dash lines, indicated in general by 13, represent the primary vertical cuts to be made by the wire saws when the ledge is completely sawed by the first series of saws. The dot-and-dash lines, indicated by 14, illustrate the secondary vertical cuts to be made transverse to the vertical cuts 13. The wire saws themselves have been omitted from this figure for purposes of illustration.

The saws are set up, as illustrated in Figs. 4 and 5, and their construction and operation will be described more in detail hereinafter.

Referring now to Figs. 4 and 5, a single wire saw, its supporting devices and its driving devices will be explained. Since all of the wire saws have the same construction, a description of one will suffice for all. It will be understood that, according to the invention, any type of wire saw may be used, the type shown being merely for the purposes of description.

For supporting the wire saw at the ledge, the standard 21 is placed in the wedge space 16 and the standard 20 is fixed adjacent the vertical face of the ledge opposite the wedge space 16. Each standard comprises essentially a vertical guide 22 having a pulley 23 at the top thereof. Each guide also has a movable pulley 24 slidable lengthwise of the guide and having a weight 25 to hold the wire saw 34 down against the working face of the cut. The movable pulley 24 may have any other type of downward feed, if desired.

For driving the wire saw, a combined driving and tensioning device is provided, located preferably a great distance from the ledge 18. This may comprise essentially a car 28 riding on tracks 128 and having a carrier 27 riding on its inclined upper face. The car 28 is secured to a fixed point, such as a tree, by an adjustable device, such as a block and tackle 29. The carrier 27 has an electric motor which drives a drive pulley 127 on which rides the wire saw 34. The extra length of wire extending from the pulley 127 to the ledge is called the tail wire and this length is denoted by 26.

The tendency of the carrier 27 to slide down the inclined surface of the car 28 serves to keep the saw 34 in proper tension. The weights 25 keep the saw against the ledge with proper cutting pressure, the pulleys 24 sliding down in the guideways 22 as the cut progresses. As the cut moves downwardly, the block and tackle 29 may be paid out to give additional useful saw length. If desired, suitable safety devices may be provided on the driving devices 27, 28 to stop the drive motor either if the saw breaks or if the saw gets stuck.

As above stated, the deposit shown in Fig. 1 is free on its two adjacent faces at the beginning of the present operation. If it is desired to cut the ledge in both directions, it is necessary to free the ledge on the other two vertical sides. Accordingly, the hole 12 is first drilled vertically to the full workable depth of the ledge and the core removed.

The wedge from space 16 may be removed in any desired manner. For example, wire saw standards may be placed within the hole 12 and at the other end of space 16. The wire saws may be set up and run in the manner described above, making vertical wire saw cuts to the bottom of the ledge, in a manner similar to the removal of wedge 19 by saws 38 and 39 (Fig. 4) described hereinafter. The material of the wedge may be removed in horizontal layers in any desired manner, such as by making horizontal splits, and may be pulled out sideways from the outer face of the deposit.

Although the space 16 is shown to be wedge shaped, it will be understood that this cut may be of other shapes. For instance, the sides of the cut may be parallel.

After the material is removed from the space 16, wire saw standards are set up therein and also on the opposite side of the ledge and wire saws are run to make the series of cuts 30, 31, 32, 33, etc. (Fig. 4).

The saws for making the vertical cuts may be arranged to advance downwardly together or they may be arranged to advance in echelon formation. This latter arrangement has certain advantages in that a smaller sawing crew is required.

To carry out the echelon arrangement, the first saw 30 is positioned by the sawing crew. The length of time to position the saw will, of course, depend upon the topography, the size of the ledge and the height of the ledge and other factors. In some cases, it will take about a day for the men to lay the saw 30.

The saw 30 is then started cutting and the saw 31 is then laid by the same crew. This saw is then started and the saw 32 is then laid, and so on, across the ledge.

Thus it will be seen that the first saw has obtained a start on the rest of the saws and likewise the second saw has obtained a start on all the other saws except the first one. This arrangement will cause the first saw to bottom first, i. e. to reach the bottom of the ledge first. When this happens, the first saw, say 30, will be transferred by the sawing crew to a position beyond the last saw laid, for example, to the position 36. This saw 36 will then be started cutting and when the second saw 31 bottoms, it in turn will be transferred to a position beyond saw 36, say to position 37, and so on, as each saw bottoms, it is transferred across the ledge and the sawing operation gradually advances across the ledge.

It will be noted that, if desired, the last two cuts, indicated by 38 and 39, may be the cuts for freeing the wedge 19 to make room for the standards for making the cuts 14 in the opposite direction. In case it is only desired to make cuts in one direction, it will not be necessary to remove the wedge 19.

In case it is desired to make cross cuts 14, the wedge 19 is removed by splitting in a manner similar to the wedge removed from space 16. This wedge may be removed from the side of the ledge without the need of derricks from above. Wire saw standards are then set up in the space caused by the removal of wedge 19 and on the opposite side of the ledge 18 and the cross cuts made in a manner similar to the primary cuts 13 described above.

Whether or not secondary cuts are made across the primary cuts, the columns extending from the top of the ledge to the full workable depth of the quarry may be left standing until required for market. They are thus stored in situ.

As the quarry blocks are needed, the blocks are removed in layers, starting from the top. In case the secondary cuts have not been made by wire saws, the secondary cuts may be made by vertical splits, or in any other desired manner.

The first and succeeding floors of quarry blocks can be removed by operation from the sides of the freed ledge. If the first horizontal flaw occurs at a depth which will give a block of the desired thickness, the layer is removed at the first horizontal flaw. If there is no natural flaw available to assist in the removal of the first layer of quarry blocks, a horizontal split is made at the first line 60 in the usual manner. Thereafter, succeeding floors of quarry blocks are removed at the natural flaws if they happen to occur at about the right place to give the desired depth of block; otherwise the floors are removed by making horizontal splits, for instance, at the lines 60. These lines are indicated only on a portion of the ledge for simplicity, but it will be understood that the succeeding floors of blocks will be removed all the way to the bottom of the ledge, providing, of course, the character of the stone continues usable.

These horizontal splits may be made in various ways well known in the art. One preferred manner of making the horizontal splits is to drill horizontal holes in the vertical side faces of the ledge a certain distance apart, for example, six inches, and then insert wedges in these holes to split the blocks off from the body of the ledge. The freed quarry blocks are then removed to the top of the deposit by derricks. It will be understood that these and all other horizontal breaks may be made by horizontal wire sawing, if desired.

As above stated, it will be understood that the method of attacking the ledge according to the invention will depend upon the conditions. The natural seams and other conditions generally determine the direction of the first or primary cuts.

Referring to Fig. 2 which shows a different form of quarry layout, in this form, the ledge to be quarried has no free vertical faces. In this case, it is necessary to drill a number of vertical holes the entire depth of the quarry, these holes being indicated by 40, 41, 42 and 43. If it is desired to make only one series of wire saw cuts 48, it is only necessary to remove the material from the spaces 44 and 47 to make room for the wire saw standards. If, however, it is desired to make secondary cuts 49 also, the material from the spaces 45 and 46 will also have to be removed to make room for the wire saw standards. After the freed ledge is cut by wire saws to the full workable depth, the quarry blocks may be removed from the columns in layers as above described.

Referring now to Fig. 3, if the ledge happens to be free on the opposite sides 50 and 51 and it is desired to make only one set of cuts 54, it is only necessary to place the wire saw standards on the opposite sides of the ledge and to make the vertical cuts 54 to the full workable depth of the quarry. If, however, it is desired to make the secondary cuts 55, it will first be necessary to remove the blocks 52 and 53 to the full workable depth of the quarry to make room for the wire saw standards. In any case, quarry blocks will be removed layer by layer after all of the vertical cuts have been made, as above described.

Although the present invention is especially adapted for quarrying oolitic limestone, as found particularly in Monroe and Lawrence Counties, Indiana, it will be understood that the invention is also applicable to quarrying other types of limestone and also sandstone, marble, and other deposits.

In Indiana limestone, the natural horizontal flaws may be fairly regular or they may not be. In one given quarry, for example, there was a series of horizontal flaws amounting to a natural slatey structure down about five feet from the top of the ledge, then there was a series of flaws varying from two to eight feet apart for the next twenty feet of depth of ledge, then a broken up bed which was simply a mass of criss cross cracks and which was about four feet thick. Below this the stone was solid and flawless for about twenty feet and then two flaws ran through it about two feet apart.

Sometimes the stone, while flawless, has discolorations or seams running through which must be avoided by quarry men. Therefore, it is of utmost importance to be able to know the vertical cross section of the ledge before making horizontal breaks.

Indiana limestone deposits vary in thickness from about twenty to eighty feet. The amount of deposit quarried depends upon conditions in the industry. For instance, if the grade of stone in the bottom is undesirable, the ledge will not be worked to its entire depth. It will be understood that the drill holes 12, 40, 41, 42 and 43 and all vertical wire saw cuts will extend the full depth of the workable quarry, i. e. from twenty to eighty feet according to the depth of the usable stone. If the horizontal flaws are closer than about three feet the ledge is usually not quarried.

While the distance between vertical wire saw cuts may vary depending upon the block sizes needed these cuts in practice will vary from, say, one foot to six or seven feet apart in one direction and from six to twenty or thirty feet apart in the other direction. The depth of the quarry blocks, according to the invention, is usually about four or five feet high. These blocks are naturally of great weight and may run up to fifty tons. These blocks are, of course, removed, as needed, by derricks working from the top surface of the ledge.

The size of the ledge section worked upon at one time, according to the invention, may vary considerably. For example, the size of the ledge layouts illustrated in Figs. 1, 2 and 3 may run 150 feet by 150 feet in area, or the ledge section may run longer in one direction than in the other, for example, 100 feet by 200 feet in area. The drill holes 12, 40, 41, 42 and 43 may be, for example, three feet in diameter.

The use of a long tail wire has the advantage of increasing the life of the wire saw. These wire saws will run in the neighborhood of a half mile of length of wire, which means that the driving apparatus may be located about a quarter of a mile from the quarry, the wire running from the ledge to the driving apparatus over pulleys mounted on trees or stakes or other supports. In case it is desirable or necessary to locate the driving apparatus close to the ledge, the long tail wire may be obtained by simply running the wire itself the necessary distance away from the ledge.

As stated above, the ledge may be cut in a single direction or in both directions. An advantage of cutting only in one direction is that the length of the quarry block can be varied as required. In this case the cross cutting is done by wedging and splitting.

The number of wire saws used in a given operation will depend upon various factors, such as the size of the ledge and the number of saws available. For example, 6 or 8 saws may be operated in a given job. The length of time it takes a wire saw to make a complete cut from the top to the bottom of the ledge will depend upon the various factors, such as the speed of saw travel, the condition of the stone, the length of the cut, etc. For example, a cut all the way from the top to the bottom of the ledge may take a week.

A further advantage of the invention is the divorcement of the cutting and the extracting operations. The wire saw crews do all the cutting before any extracting whatsoever is done. This gets the two crews out of each other's way and makes it possible to do the cutting at any time of the year. By prior art quarrying methods, quarrying is limited to six summer months because freshly extracted stone may be ruined by freezing. By the use of the invention, however, the vertical cutting can be done regardless of the season because a wire saw cut is too small for allowing natural air circulation between blocks to freeze them.

Furthermore, the invention has the advantage that it is not necessary to remove the stone vertically by derricks during the vertical cutting operation. According to the prior art, a derrick is necessary during the vertical cutting operation to serve the channeling machines and to remove the key blocks necessary to opening up new floors. According to the invention, it is not necessary to open up a floor by removing key blocks, but the horizontal breaks may be made from spaces left by the wedge pieces which have been pulled out from the side to free the ledge. Furthermore, the waste involved in the key block removal is eliminated.

A further advantage of the invention is the use of saws which are absolutely independent. These permit the gradual working of the saws across the ledge, as above described, and also permit each saw to take advantage of the soft spots in the stone it may hit. Furthermore, if one saw breaks down, it does not tie up the other saws. A small crew can work the saws, moving the saws, as they bottom, to the side of the last one started.

As will be seen from the above, the present invention has many advantages over prior art systems using channelers. The maximum depth channelers can cut is about ten feet. Furthermore, as a floor is cut through with channelers, the floor has to be removed to make room for the channelers to work on the next floor. This means expensive hoisting of the quarry blocks out of the quarry to be stored in piles to await market demand. Furthermore, the channelers have the disadvantage of not being able to see ahead. Channelers may cut a floor which is valueless because it is cut up by flaws and this fact will not be known until the floor is removed.

A further advantage of wire saws is the decreased loss due to the cut. A wire saw cut is, for example, about one-quarter of an inch wide. It cuts somewhat irregularly so an allowance of one-quarter of an inch loss on each side of the cut proper would be ample to figure, making the total loss of a wire saw cut about three-quarters of an inch. On the other hand, a loss due to a channeler cut will run considerably greater. The channeler cuts proper are, for example, two and one-half inches wide. The cutting irons weave about somewhat, making the total wastage of about four inches for every cut. In addition, channelers are large and unwieldy and difficult to handle.

Furthermore, the use of the invention permits an entire quarry to be cut up vertically before any market demand, the stone standing in situ, until the demand arises. When this occurs, it is only necessary to separate the quarry blocks from the standing columns and remove them direct to the desired point. No separate removal for storing is necessary as is the case with channelers in the prior art.

In the above description and in the claims, the word "break" is meant to include separation of the quarry blocks either at flaws or by actual splitting. This application is a continuation in part of application Serial No. 420,683, filed January 14, 1930, Quarrying.

While certain novel features of the invention have been disclosed and are pointed out in the annexed claims, it will be understood that various omissions, substitutions and changes may be made by those skilled in the art without departing from the spirit of the invention.

What is claimed is:

1. The method of quarrying which comprises freeing two upstanding adjacent sides of the ledge, drilling a substantially vertical hole at a point remote from said sides, cutting out and removing wedge shape pieces from said hole to said two sides, thereby forming a section free on all four upstanding sides, dividing said section into columns extending the depth of said hole and removing horizontal layers from said columns as needed, the depth of said hole, wedge shape pieces and columns being that at which it is desired to work the ledge at the time and extending through a considerable number of block-removing layers.

2. The method of quarrying which comprises first making a series of deep vertical cuts from the top face of a ledge to a depth of more than 20 feet into the quarry, and then removing quarry blocks in horizontal floor layers starting from the top as the stone is needed.

3. The method of quarrying limestone which comprises removing the overburden and exposing the top of the limestone deposit, removing material from the two opposite sides of the ledge throughout a depth of more than 20 feet of the deposit to note the position of the natural horizontal flaws and the condition of the deposit, making a plurality of parallel, vertical wire saw cuts from the top face of the deposit extending between the freed side faces of the upstanding ledge to a depth of more than 20 feet into the deposit, thereafter removing quarry blocks in horizontal floor layers from the ledge starting at the top either at the natural horizontal flaws or by making horizontal breaks at the desired points.

4. The method of quarrying limestone which comprises exposing the top face of the limestone layer, freeing the ledge on two opposite sides thereof, inspecting the ledge to note the natural horizontal flaws and to note unusable stone, making a plurality of deep cuts from the top face of the ledge down more than 20 feet into the ledge, horizontally splitting the ledge between natural horizontal flaws if necessary to provide blocks of the proper thickness, and removing the quarry blocks in layers from the top as needed either at the flaws or at the splits.

5. The method of quarrying Indiana limestone which comprises making a plurality of vertical, straight, parallel wire saw cuts from the top face of the ledge of a depth of from 20 to 80 feet, thereby providing a plurality of substantially vertical, closely standing, high columns free on all sides, said cuts being from 1 to 7 feet apart, permitting said columns to remain in situ until needed, horizontally breaking said columns in horizontal layers of from 4 to 5 feet thick, and removing the layers of quarry blocks from the top as they are freed from the columns.

6. The method of quarrying Indiana limestone which comprises freeing on all four sides a section of ledge of from 100 to 200 by from 100 to 200 feet in area and of from 20 to 80 feet in height, placing a plurality of sets of stationary wire saw standards on a first pair of opposite sides of the freed section and extending the entire height of the section, placing a plurality of wire saws across the top of the section between said standards to make a plurality of vertical cuts extending from the top of the section clear to the bottom thereof, then placing a plurality of sets of similar stationary wire saw standards on the other pair of opposite sides of the ledge, positioning a plurality of wire saws between said second sets of standards to make a plurality of vertical cuts extending the full depth of the ledge, said first cuts being from 1 to 7 feet apart, said second cuts being from 6 to 30 feet apart, thereby forming a plurality of substantially vertical, closely standing, high columns free on all sides, and thereafter removing quarry blocks by breaking said slices in horizontal layers from 4 to 5 feet thick, starting at the top.

7. The method of quarrying which comprises first making a series of vertical wire saw cuts from the top surface of the ledge downwardly to a depth greater than 20 feet to form a series of upstanding columns, and then removing quarry blocks in horizontal layers from the top of the columns as needed without making any further vertical cuts.

JOHN B. NEWSOM.